US012686597B2

(12) United States Patent
Josin

(10) Patent No.: US 12,686,597 B2
(45) Date of Patent: Jul. 21, 2026

(54) SPREADER SYSTEM, SPREADER, AND METHOD OF HANDLING A TRANSPORT CONTAINER USING A SPREADER

(71) Applicant: ELME SPREADER AB, Älmhult (SE)

(72) Inventor: Thomas Josin, Strömsnäsbruk (SE)

(73) Assignee: ELME SPREADER AB, Älmhult (SE)

( * ) Notice: Subject to any disclaimer, the term of this patent is extended or adjusted under 35 U.S.C. 154(b) by 859 days.

(21) Appl. No.: 17/914,094

(22) PCT Filed: Mar. 25, 2021

(86) PCT No.: PCT/SE2021/050261
§ 371 (c)(1),
(2) Date: Sep. 23, 2022

(87) PCT Pub. No.: WO2021/201747
PCT Pub. Date: Oct. 7, 2021

(65) Prior Publication Data

US 2023/0116088 A1 Apr. 13, 2023

(30) Foreign Application Priority Data

Mar. 30, 2020 (SE) .................................. 2050350-4

(51) Int. Cl.
*B66C 1/10* (2006.01)
*B66C 13/08* (2006.01)
(Continued)

(52) U.S. Cl.
CPC .............. *B66C 1/101* (2013.01); *B66C 13/08* (2013.01); *B66C 13/46* (2013.01); *B66C 23/905* (2013.01); *B66F 9/186* (2013.01)

(58) Field of Classification Search
CPC ......... B66C 1/101; B66C 13/08; B66C 13/46; B66C 23/905; B66C 13/06; B66C 15/06; B66F 9/186
See application file for complete search history.

(56) References Cited

U.S. PATENT DOCUMENTS 3,210,114 A * 10/1965 Lawton .................. B66C 13/08 414/754
3,608,384 A * 9/1971 Hardin .................... B66C 13/08 74/5.22
(Continued)

FOREIGN PATENT DOCUMENTS

CN 103130089 A 6/2013
CN 108341349 A 7/2018
(Continued)

OTHER PUBLICATIONS

International Search Report and Written Opinion of International Application PCT/SE2021/050261 mailed May 18, 2021, all pages cited in its entirety.
(Continued)

*Primary Examiner* — Patrick H Mackey
(74) *Attorney, Agent, or Firm* — Burr & Forman

(57) ABSTRACT

A spreader (24) comprises a main frame carrying container connector arrangements configured to engage with a transport container (10); a rotator enabling rotation of the main frame in relation to a crane bracket about a substantially vertical rotation axis (A2); a rotation motor configured to, responsive to a rotation control signal, operate the rotator to rotate the main frame; a rotation detector configured to detect rotation of the main frame in relation to the crane bracket; and a control system configured to, based on a discrepancy between the rotation control signal and a rotation detected by the rotation detector, generate a rotation alert signal.

17 Claims, 8 Drawing Sheets

(51) Int. Cl.

| | |
|---|---|
| ***B66C 13/46*** | (2006.01) |
| ***B66C 23/90*** | (2006.01) |
| ***B66F 9/18*** | (2006.01) |

(56) References Cited

U.S. PATENT DOCUMENTS

| | | | | | |
|---|---|---|---|---|---|
| 5,816,098 | A * | 10/1998 | Kanki | B66C 13/08 74/5.22 |
| 5,871,249 | A * | 2/1999 | Williams | G01C 21/18 74/5.34 |
| 7,950,539 | B2 * | 5/2011 | Henriksson | B66C 13/063 212/270 |
| 8,000,835 | B2 * | 8/2011 | Friz | B66C 13/08 294/67.5 |
| 10,968,081 | B2 * | 4/2021 | Karlsson | B66C 1/66 |
| 11,702,323 | B2 * | 7/2023 | Klement | B66C 13/46 701/523 |
| 12,358,760 | B2 * | 7/2025 | Thomson | B66C 13/08 |
| 2011/0120968 | A1 | 5/2011 | Stinis | |
| 2019/0202671 | A1 | 7/2019 | Ono | |
| 2019/0375615 | A1 * | 12/2019 | Markwell | B66C 1/10 |
| 2023/0373758 | A1 * | 11/2023 | Förander | B66C 1/101 |

FOREIGN PATENT DOCUMENTS

| | | | | | |
|---|---|---|---|---|---|
| EP | 1674420 | A1 | | 6/2006 | |
| EP | 1930289 | A2 | | 6/2008 | |
| EP | 3059200 | A1 | | 8/2016 | |
| GB | 2467149 | A | * | 7/2010 | B66C 13/08 |
| JP | H09136786 | A | * | 5/1997 | |
| WO | 2017007613 | A1 | | 1/2017 | |
| WO | WO-2017135851 | A1 | * | 8/2017 | E04C 3/07 |
| WO | 2018090104 | A1 | | 5/2018 | |
| WO | 20200055249 | A1 | | 3/2020 | |

OTHER PUBLICATIONS

Notification of the First Office Action from corresponding Chinese Application No. 202180023369.2, mailed Mar. 31, 2026, all pages cited in its entirety.

* cited by examiner

SPREADER SYSTEM, SPREADER, AND METHOD OF HANDLING A TRANSPORT CONTAINER USING A SPREADER

FIELD OF THE INVENTION

The present invention relates to a spreader system, to a spreader, and to a method of handling a transport container using a spreader.

BACKGROUND

An intermodal transport container is a standardized shipping container which can be used across and transferred between different modes of transport, such as rail, truck and ship, without unloading and reloading the cargo inside the container. Containers and other types of rigid load carriers of different standard dimensions are normally handled with the aid of a container spreader or yoke, which may typically be carried by a truck or a crane. The spreader attaches to a container at lifting castings, which are often called corner castings as they are typically arranged in all corners of a standard 20- or 40-foot container. For the purpose, the spreader is provided with a plurality of twist-locks or other container connector arrangements, which are known in the art. Often, the spreader is telescopic so as to allow changing the distance between container connector arrangements along a longitudinal axis of the container, in order to accommodate for containers of different standard lengths. Standards for intermodal containers are specified by the International Organization for Standardization, ISO, e.g. in the standards ISO 668:2013 and ISO 1496-1:2013.

WO2017135851A1 discloses a top-lift spreader for handling intermodal transport containers.

Intermodal containers are heavy, and careless handling of such containers may be dangerous. A complicating aspect is that containers may be of different types, sizes, and loads.

SUMMARY

It is an object of the present invention to solve, or at least mitigate, parts or all of the above mentioned problems. To this end, there is provided a spreader system comprising a spreader for lifting a transport container, the spreader comprising a main frame having a first end and a second end, and extending along a longitudinal axis between said first end and said second end, the first end carrying a first container connector arrangement and the second end carrying a second container connector arrangement, each of said first and second container connector arrangements being configured to engage with a transport container; a main frame carrier comprising a crane bracket and a rotator enabling rotation of the main frame, and thereby any container(s) held by the spreader, in relation to the crane bracket about a substantially vertical rotation axis; a rotation motor configured to, responsive to a rotation control signal, operate the rotator to rotate the main frame in relation to the crane bracket; and a rotation detector configured to detect rotation of the main frame in relation to the crane bracket, wherein the spreader system further comprises a control system configured to, based on a discrepancy between the rotation control signal and a rotation detected by the rotation detector, generate a rotation alert signal. Thereby, any rotation of the main frame which was not commanded by the rotation control signal may be detected, which allows detecting potentially dangerous situations due to e.g. eccentric loads. A heavily eccentric load of the container, combined with holding the spreader such that the rotation axis of the rotator is not vertical, may generate a torque about the rotation axis which may exceed the power of the rotation motor. If so, the main frame holding the container may turn uncontrollably in the rotator, and any effort to operate the rotator in the opposite direction using the rotation motor will fail. The crane bracket allows connecting the spreader to a crane, such as a wire crane or an articulating and/or telescopic boom crane, which may be carried by e.g. a vehicle such as a reach stacker. According to embodiments, the crane bracket may be configured to enable the spreader to be rigidly connected to a crane arm or boom. The crane bracket may be supplemented by one or more actuators, such as one or more hydraulic cylinders, which may likewise be configured to be connected to the crane arm or boom such that the rigid connection between the crane arm and the spreader is defined by a rigidly controllable joint.

According to embodiments, the transport container may be an intermodal transport container provided with lifting castings, such as a transport container pursuant to any of the standards ISO 668:2013 and ISO 1496-1:2013. Each of said container connector arrangements may comprise at least one respective lifting casting connector configured to engage with a lifting casting of an intermodal transport container. Alternatively or additionally, the container connector arrangements may comprise grapple arms for gripping a bottom face of the container; in such an embodiment, the container does not need any lifting castings at the corners. The spreader may be a top lift spreader configured to connect from above to four lifting castings, arranged in a rectangular pattern, of the container to be lifted. Alternatively, the spreader may be a side lift spreader configured to attach only to lifting castings of one single vertical side face of the container. The control system may be arranged within the spreader as such, or within other parts of a container handling equipment, such as a truck or wire crane, carrying the spreader. Still alternatively, the control system may be in a computing cloud remote from any container handling equipment. Hence, the spreader system defined above may be comprised of the spreader only, or of the spreader in combination with a container handling equipment carrying the spreader and a control system separate from the spreader. The rotation alert signal may be transmitted to the spreader and/or to any other parts of a container handling equipment carrying the spreader and/or to an operator via a user interface, such as a warning lamp, a display, or any means for generating an audible warning signal.

According to embodiments, the rotation detector may be configured to detect a rotation direction of the main frame in relation to the crane bracket. This facilitates determining a suitable countermeasure for e.g. preventing undesired rotation. By way of example, an uncommanded rotation in a certain rotation direction, or lack of commanded rotation in a certain direction, may be countered by side-shifting the load in a respective direction along the longitudinal axis, in order to move the centre of mass of the load in the correct direction towards the rotation axis.

According to embodiments, the control system may be configured to generate said rotation alert signal based on a determination that a detected rotation direction is opposite to a rotation direction dictated by said rotation control signal. Rotation of the main frame in the wrong direction is a particularly strong indicator of a dangerous situation.

According to embodiments, the rotation detector may be configured to determine a rotation speed of the main frame in relation to the crane bracket. For example, the rotation detector may be configured to generate said rotation alert signal based on said speed exceeding a limit speed. A high rotation speed is a strong indicator of a potentially dangerous situation, regardless of whether the rotation takes place in the rotation direction dictated by the rotation control signal, or in the opposite rotation direction.

According to embodiments, the rotation detector may be configured to determine an absolute rotation in relation to a reference position. Such an arrangement permits setting one or two endpoints of an allowed range of rotation, and may prevent operating the rotation motor to rotate the main frame beyond said end point(s). It also permits indicating when the rotator is centered. The reference position may correspond to the position when the rotator is centered. For a spreader carried by a truck, the centered position may correspond to when the longitudinal axis of the main beam is parallel to the wheel axles of the truck, when the truck is driving straight. The rotation detector may be configured to determine a relative rotation and, based on the relative rotation, update an absolute rotation value in a volatile or non-volatile memory to keep track of the absolute rotation value. The update may be done on a regular basis, or whenever a relative rotation is detected.

According to embodiments, the spreader system may further comprise at least one rotation brake configured to, based on said rotation alert signal, mechanically brake and/or block a rotation between the crane bracket and the main frame. Such an arrangement increases the safety of the spreader even further, since an automatic braking gives the operator time to review and analyze the situation. The rotation brake may be co-located with the rotation motor, and may operate e.g. on a brake disc connected to the rotation motor's output shaft. If the rotator is rotated by more than one rotation motor, each of the rotation motors may be provided with a respective rotation brake.

According to embodiments, the control system may be configured to, based on the rotation alert signal, stop the operation of the rotation motor and/or generate a warning signal to an operator via a user interface. Thereby, the operator may be alerted of the dangerous condition, and may take corrective measures.

According to embodiments, the main frame may be connected to the rotator via a main frame suspension arrangement, wherein the main frame is translatably suspended in said main frame suspension arrangement to enable translation along said longitudinal axis. The possibility of side-shifting the load via a main frame suspension arrangement both increases the risk that an eccentric load situation occurs, and provides a convenient means of centering an eccentric load. A side-shift arrangement may comprise e.g. a downwards-facing surface of the main frame slidably vertically resting on an upwards-facing surface of the main frame suspension arrangement, to enable a longitudinal translation between the main frame and the main frame suspension arrangement. The downwards-facing surface of the main frame and the upwards-facing surface of the main frame suspension arrangement may be horizontal surfaces. As an example of an alternative configuration, the spreader may be configured as a gantry hang spreader, wherein the main frame would hang from the main frame suspension arrangement via a plurality of vertical links, which are pivotally connected to the main frame as well as the main frame suspension arrangement. The vertical links may be configured as hang bars, which may be side-shifted in any other suitable manner. The hang bars may optionally be configured as hydraulic cylinders, thereby also enabling adjusting a tilt of the container.

According to embodiments, the control system may be configured to, based on said rotation alert signal, impose a control constraint limiting a set of permissible operations of the spreader. Thereby, if uncommanded rotation is detected, the operator may be automatically prevented from making things worse. The control constraint may comprise, for example, limiting further lifting of a container from the ground, and/or limiting a possibility to tilt the rotator about an axis parallel to the longitudinal axis.

According to some embodiments, the control constraint may limit side-shifting of the main frame along said longitudinal axis. By way of example, the control constraint may limit side shifting the main frame in the direction which increases the eccentricity of the load, i.e. increases the longitudinal distance between the load's centre of mass and the rotation axis. The side shift control constraint may be applied to e.g. the possibility of translating the main frame in a main frame suspension arrangement as defined above.

According to embodiments, the spreader may comprise a detector for detecting a position along said longitudinal axis of a centre of mass of the container, or of the parts of the spreader rotatable about the rotation axis and any container attached thereto, wherein said control system is configured to, based on a detected position of said centre of mass, brake or block a rotation between the crane bracket and the main frame, and/or impose a control constraint limiting a possibility to tilt the rotator about an axis parallel to the longitudinal axis.

According to embodiments, the rotation motor may be a hydraulic motor. According to some embodiments, two or more hydraulic motors may be in simultaneous driving engagement with the rotator.

According to embodiments, the rotation motor may be connected to the rotator via a gear arrangement, wherein the rotation detector is configured to detect rotation based on detection of the presence of at least one gear tooth of the gear arrangement. Thereby, the at least one gear tooth provides a periodic signal based on the rotation of the respective gear of the gear arrangement, wherein the period of the periodic signal indicates a speed of rotation. The at least one gear tooth may comprise all gear teeth of a gear of the gear arrangement. The gear arrangement may comprise a pinion in driving engagement with a gear rim of the rotator, and the rotation detector may be configured to detect the gear teeth of the pinion. The rotation detector may comprise at least one electromagnetic sensor, such as a capacitive sensor or an inductive sensor, configured to sense the gear teeth.

According to embodiments, the rotation detector may comprise two gear tooth detectors arranged at a periphery of a gear of the gear arrangement, at mutual positions enabling said gear tooth detectors to sense the presence of gear teeth out of phase with each other. Thereby, the period of the sensor signal indicates the rotation speed, whereas the phase between the sensor signals indicates the rotation direction. The two gear tooth detectors may be electromagnetic sensors, such as capacitive or inductive sensors.

According to embodiments, the first container connector arrangement may comprise a first travelling beam, and the second container connector arrangement may comprise a second travelling beam, wherein a proximal end of the first travelling beam is guided in the main frame to be telescopically extendable from the main frame in a first direction along said longitudinal axis, and a distal end of the first travelling beam is configured to engage with a first end of said transport container, and wherein a proximal end of the second travelling beam is guided in the main frame to be telescopically extendable from the main frame in a second direction along said longitudinal axis, and a distal end of the second travelling beam is configured to engage with a second end of said transport container. Thereby, the longitudinal distance between the first and second container connector arrangements may be changed, to accommodate for transport containers of different lengths. By way of example, containers often have a standard length of 20 feet or 40 feet, and the first and second container connector arrangements may be telescopically extendable to allow connecting to any of those lengths. Optionally, the main frame may comprise a first travelling beam guide which guides the first travelling beam along the longitudinal axis, and adjacent to said first travelling beam guide, a second travelling beam guide which guides the second travelling beam along the longitudinal axis. Alternatively, the travelling beams may be guided one inside the other.

According to embodiments, each of said first and second container connector arrangements may comprise a respective transversal beam extending in a direction transversal to the longitudinal axis, each of said transversal beams being provided with two respective lifting casting connectors separated along said transversal direction, for connecting to two lifting castings of said transport container. The transversal direction may be substantially perpendicular to said longitudinal axis. Typically, the two lifting casting connectors of a transversal beam connect to two respective short-side lifting castings of the container, such that the two container connector arrangements connect to the lifting castings of all four corners of a rectangular face of the intermodal container.

According to a second aspect, parts or all of the above mentioned problems are solved, or at least mitigated, by a method of handling a transport container using a spreader, the method comprising: determining a rotation status of the transport container based on a signal from a rotation sensor; comparing the rotation status to an expected rotation status determined based on a rotation control signal; and, based on said comparison, generating a rotation alert signal. The method may be performed using a spreader as defined above. The rotation status may indicate whether the container has been rotated from a previously recorded position or not. The rotation status may also indicate a rotation direction and/or a rotation angle and/or a rotation speed of the container.

According to a third aspect, parts or all of the above mentioned problems are solved, or at least mitigated, by a spreader for lifting a transport container, the spreader comprising a main frame having a first end and a second end, and extending along a longitudinal axis between said first end and said second end, the first end being provided with a first container connector arrangement and the second end being provided with a second container connector arrangement, each of said first and second container connector arrangements comprising at least one respective lifting casting connector configured to engage with a lifting casting of an intermodal transport container; a main frame carrier comprising a crane bracket and a rotator enabling rotation of the main frame, and thereby any container(s) held by the spreader, in relation to the crane bracket about a rotation axis which is substantially perpendicular to the longitudinal axis; a rotation motor connected to the rotator via a gear arrangement and configured to, responsive to a rotation control signal, operate the rotator to rotate the main frame in relation to the crane bracket, and a rotation detector configured to detect rotation of the main frame in relation to the crane bracket, the rotation detector comprising a gear tooth detector configured to detect the presence of at least one gear tooth of the gear arrangement.

According to an embodiment, the rotation detector comprises two gear tooth detectors arranged at a periphery of a gear of the gear arrangement, at mutual positions enabling said gear tooth detectors to sense the presence of gear teeth out of phase with each other.

It is noted that embodiments of the invention may be embodied by all possible combinations of features recited in the claims. Further, it will be appreciated that the various embodiments described for the spreader system according to the first aspect and the spreader according to the third aspect are all combinable with the method as defined in accordance with the second aspect, and vice versa.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

Figure 1:
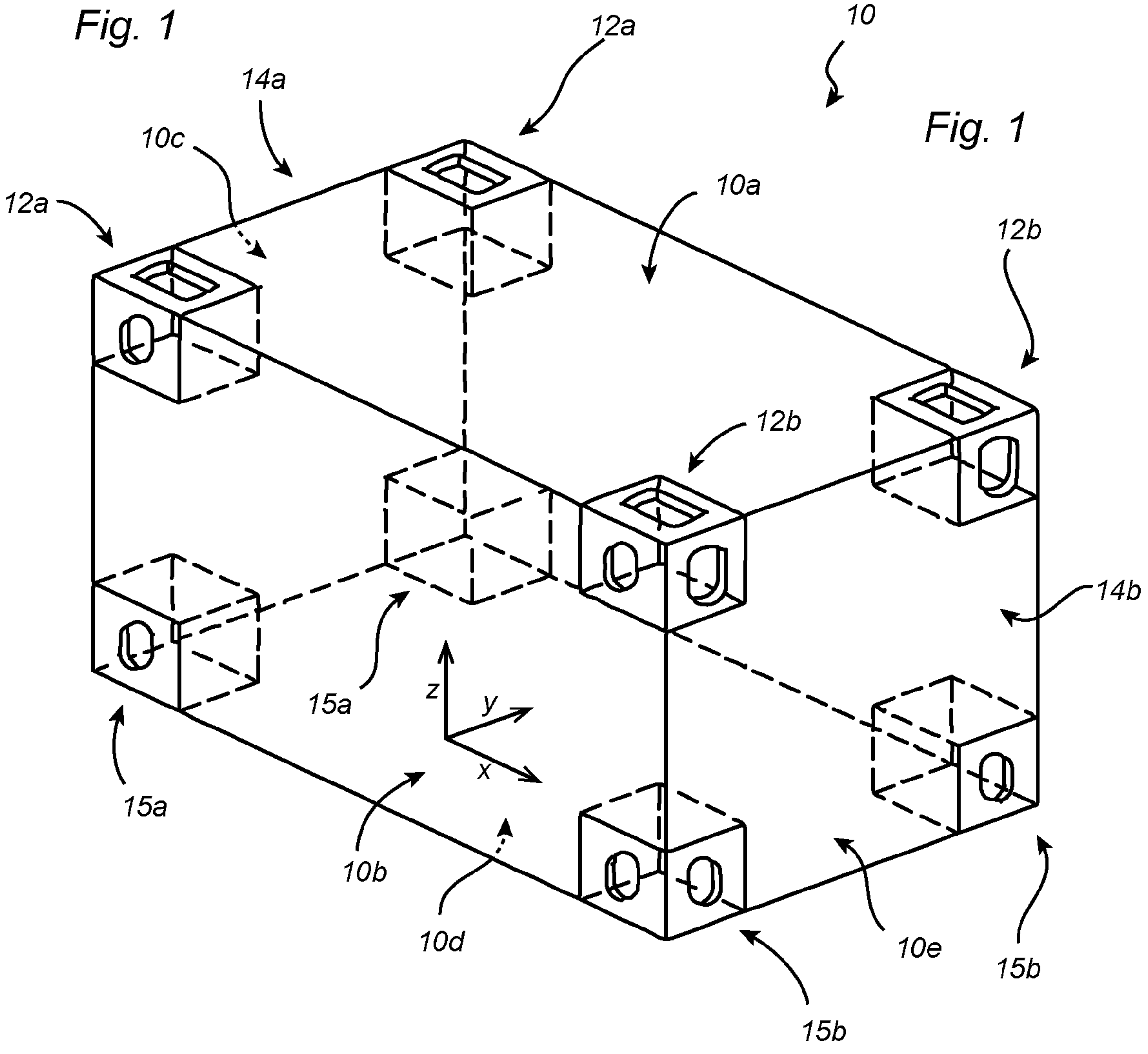
FIG. 1 is an illustration in perspective of an intermodal transport container.

FIG. 1 schematically illustrates an intermodal container 10 according to the above-mentioned ISO standards. The container 10, which for clarity is illustrated transparent, has a top face 10*a*, a first longitudinal side 10*b*, and a first short side or gable side 10*c*. The container also has a bottom face 10*d*, a second longitudinal side, and a second gable side 10*e*, which are located parallel and opposite the top face 10*a*, first longitudinal side 10*b*, and first gable side 10*c*, respectively. Each corner of the container 10 is provided with a respective lifting casting for attaching a respective lifting casting connector, for the purpose of facilitating the handling of the container 10, and for locking the container 10 to other containers or to the deck of a freight ship. Hence, the container top corners which define the corners of the top face 10*a* are provided with two lifting castings 12*a* at a first longitudinal end 14*a* of the container 10, and two lifting castings 12*b* at a second longitudinal end 14*b* of the container 10. Similarly, the container bottom corners are provided with four bottom lifting castings 15*a*, 15*b* at the four corners of the bottom face.

FIG. 1 also illustrates the container 10 arranged in a cartesian coordinate system, wherein the bottom face 10*d* of the container 10 is in the x-y plane, the longitudinal sides 10*b* of the container 10 are arranged along the x-z plane, and the gable sides 10*c*, 10*e* of the container 10 are arranged along the y-z plane. The rotation directions of a container 10 are typically given by reference to the directions of rotation of a container arranged on a cargo ship. Containers 10 arranged on a cargo ship are aligned with the cargo ship having the longitudinal sides 10*b* along the length of the cargo ship. The rotational motions of the container may therefore be defined by reference to the motions of the cargo ship, i.e. list, trim and skew. List is rotation about the x-axis, and is sometimes also referred to as tilt. Trim is rotation about the y-axis; herein, trim may also be referred to as sideways leaning of the container 10. Skew is rotation about the z-axis.

Figure 2:
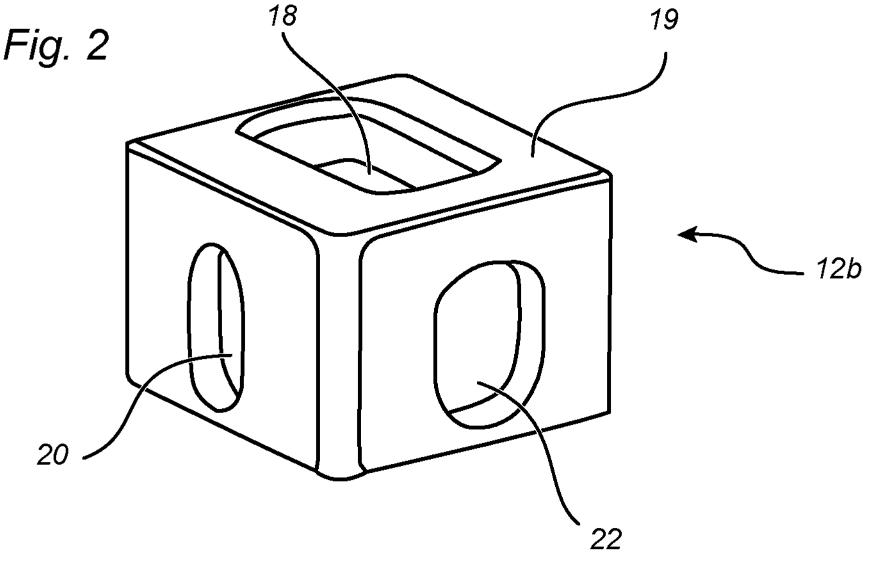
FIG. 2 is an illustration in perspective of a top lifting casting of the intermodal transport container of FIG. 1.

FIG. 2 illustrates one of the top lifting castings 12*b* in greater detail, in the same perspective as that of FIG. 1. It is provided with a top face lock opening 18, a longitudinal side lock opening 20, and a gable lock opening 22, each of which is configured to receive and engage with a male insert of a lifting casting connector, such as a lifting hook or a twist-lock. It will be appreciated that all top lifting castings 12*a*, 12*b* may be identical, albeit in a mirror configuration.

Figure 3:
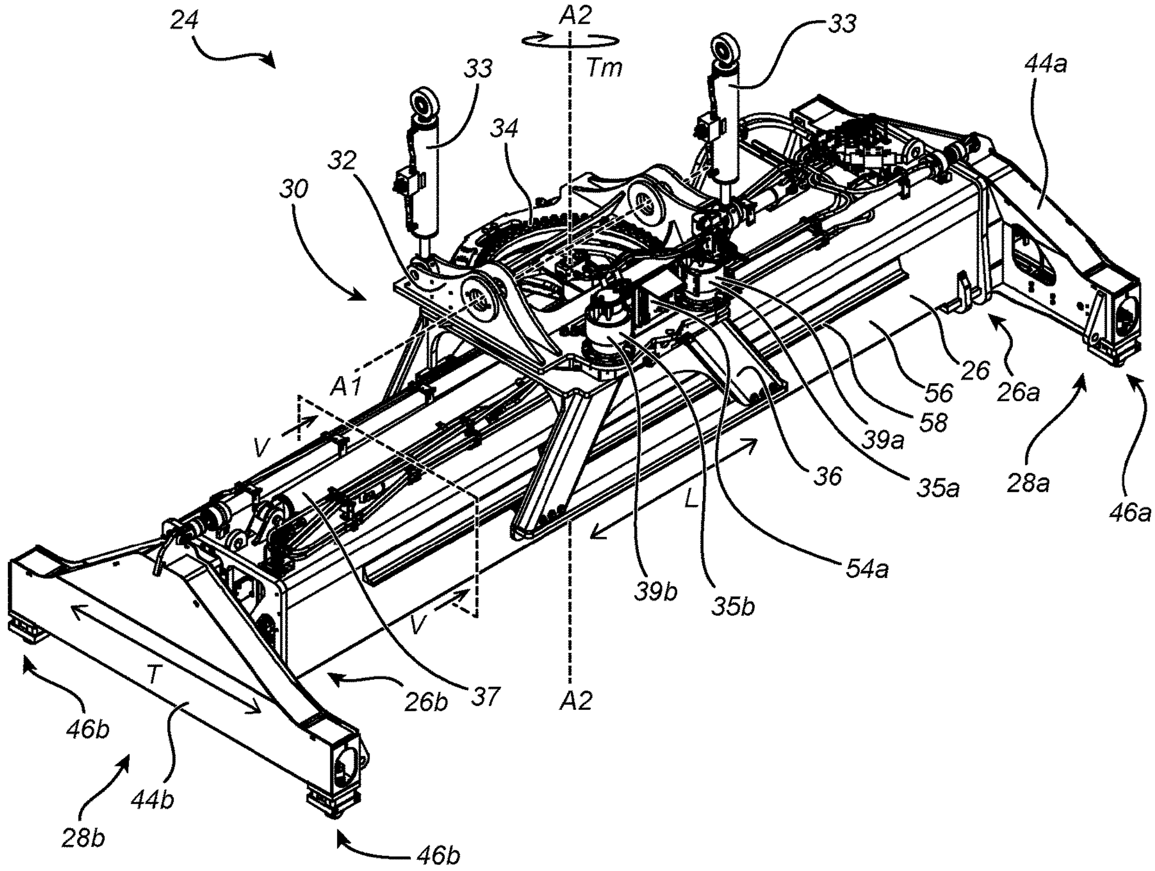
FIG. 3 is an orthographic projection of a spreader for handling the container of FIG. 1.

FIG. 3 illustrates a top-lift spreader 24 for handling an intermodal transport container according to the above-mentioned ISO standards. The spreader 24 comprises a main frame 26 extending along a longitudinal axis L between a first end 26*a* and a second end 26*b*. The first end 26*a* carries a first container connector arrangement 28*a* configured to be connected to the first end 14*a* of the container (FIG. 1), and the second end 26*b* carries a second container connector arrangement 28*b* configured to be connected to the second end 14*b* of the container (FIG. 1).

The spreader 24 further comprises a main frame carrier 30 comprising a crane bracket 32, which is configured to be connected to a crane (not illustrated) such as a telescopic boom crane or a wire crane. The crane bracket 32 is connectable to the crane to enable tilting the container about a horizontal tilt axis A1, extending along the longitudinal axis L, for changing the tilt of the container 10 (FIG. 1). For the purpose, a pair of hydraulic tilt cylinders 33 are likewise connectable to the crane. The main frame carrier 30 further comprises a rotator 34 enabling rotation of the main frame 26, and thereby any container(s) 10 held by the spreader 24, in relation to the crane bracket 32 about a substantially vertical rotation axis A2 for changing the skew of the container. A first hydraulic rotation motor 35*a* and a second rotation motor 35*b* are configured to, responsive to a rotation control signal from a spreader control system 54*a*, operate the rotator 34 to rotate the main frame 26 in relation to the crane bracket 32. Even though one rotation motor 35*a* may be sufficient for rotating the main frame 26, the torqued added by the second motor 35*b* may increase the spreader's 24 ability to rotate heavy loads. The total rotation torque applied about the rotation axis A2 by the rotation motors 35*a*, 35*b* is indicated by an arrow Tm. The main frame carrier 30 also comprises a main frame suspension arrangement 36 enabling translation of the main frame 26 relative to the main frame carrier 30 along the longitudinal axis L. The main frame suspension arrangement 36 thereby carries the weight of a suspension arrangement load comprising the main frame 26, the container connector arrangements 28*a*, 28*b*, and any container(s) 10 attached to the container connector arrangements 28*a*, 28*b*. A side-shift mechanism 37, configured as a hydraulic cylinder extending along the main frame 26, is connected to the main frame 26 as well as to the main frame suspension arrangement 36. The side-shift mechanism 37 enables, responsive to a side-shift control signal from the spreader control system 52*a*, moving the main frame 26 relative to the main frame suspension arrangement 36 along the longitudinal axis L. The side-shift mechanism 37 also comprises a side-shift sensor (not illustrated) enabling determining the mutual positional relationship between the main frame suspension arrangement 36 and the main frame 26. The side-shift sensor may be arranged within the hydraulic cylinder as such, or be provided as a separate sensor.

Figure 4A:
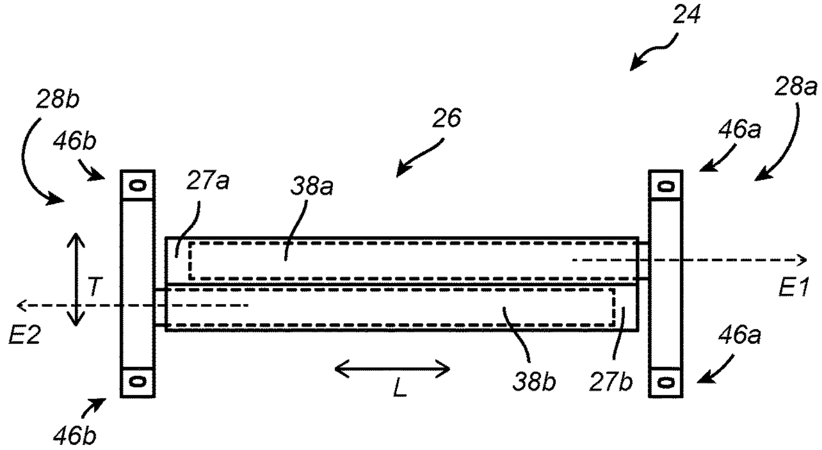
FIG. 4A is a schematic illustration of the spreader of FIG. 3 as seen from below, when in a longitudinally retracted position.
Figure 4B:
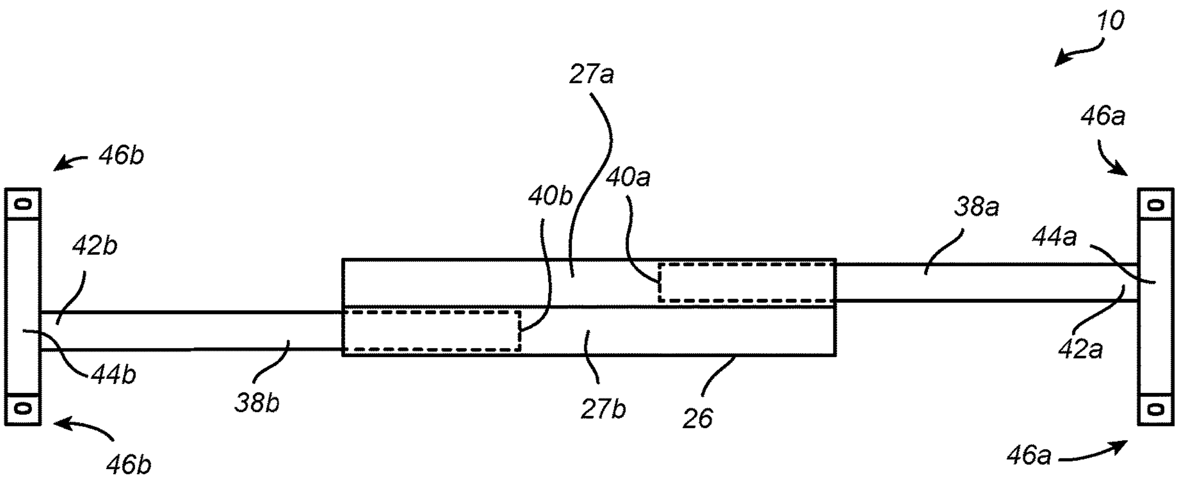
FIG. 4B is a schematic illustration of the spreader of FIG. 3 as seen from below, when in a longitudinally extended position.

FIGS. 4A and 4B illustrate the spreader 24 in a highly schematic manner, and as seen from below. The first container connector arrangement 28*a* comprises a first travelling beam 38*a* guided in first travelling beam guide configured as a sleeve 27*a* within the main frame 26. Similarly, the second container connector arrangement 28*b* comprises a second travelling beam 38*b* guided in second travelling beam guide configured as a sleeve 27*b* within the main frame 26. The travelling beams 38*a*, 38*b* are telescopically extendable between a retracted position (FIG. 4A) for connecting the spreader 24 to a 20-foot container, and an extended position (FIG. 4B) for connecting the spreader 24 to a 40-foot container. A proximal end 40*a* of the first travelling beam 38*a* is guided in the main frame 26 to be telescopically extendable from the main frame 26 in a first extension direction E1 along the longitudinal axis L, and a distal end 42*a* of the first travelling beam 38*a* is provided with a respective first transversal beam 44*a* extending in a transversal direction T substantially perpendicular to the longitudinal axis L. The first container connector arrangement 28*a* further comprises a first pair of lifting casting connectors configured as twist-locks 46*a* arranged at opposite ends of the first transversal beam 44*a*, which first pair of twist-locks 46*a* are connectable to the top face lock openings 18 (FIG. 2) of the top lifting castings 12*a* of the container's 10 first longitudinal end 14*a*.

Similarly, a proximal end 40*b* of the second travelling beam 38*b* is guided in the main frame 26 to be telescopically extendable from the main frame 26 in a second extension direction E2 opposite to the first extension direction along the longitudinal axis L, and a distal end 42*b* of the second travelling beam 38*b* is provided with a respective second transversal beam 44*b* extending along the transversal direction T. The second container connector arrangement 28*b* comprises a second pair of lifting casting connectors configured as twist-locks 46*b* arranged at opposite ends of the second transversal beam 44*b*, which second pair of twist-locks 46*b* are connectable to the top face lock openings 18 (FIG. 2) of the top lifting castings 12*b* of the container's 10 second longitudinal end 14*b*. For the sake of clarity, it is pointed out that FIG. 3 illustrates the spreader 24 with the travelling beams 38*a*, 38*b* in the retracted position, such that they are hid within the main frame 26.

Figure 5:
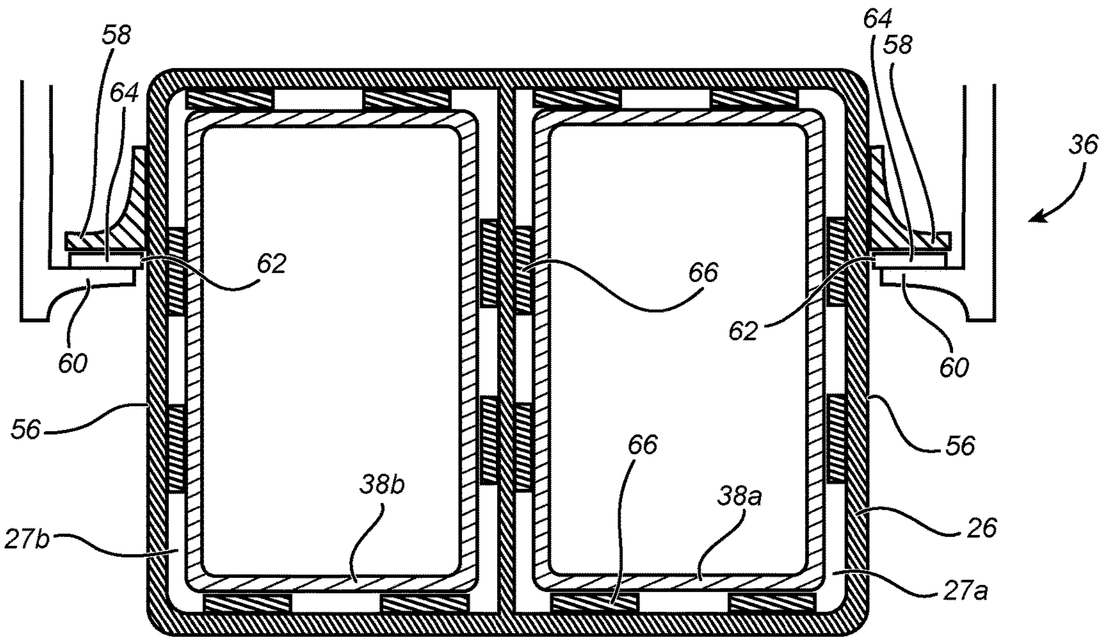
FIG. 5 illustrates a cross-section of a main frame and a main frame suspension arrangement of the spreader of FIG. 3, the cross-section being taken along the plane V-V of FIG. 3.

FIG. 5 highly schematically illustrates the main frame 26 and the main frame suspension arrangement 36 in a section along a section plane V-V (FIG. 3) perpendicular to the longitudinal axis L. The main frame comprises a pair of opposite outer side wall faces 56. A respective side-shift rail 58 is welded to the outer face of each side wall 56, the side-shift rails 58 protruding from the side walls 56 and extending along the longitudinal axis L (FIG. 3). Each side-shift rail 58 is vertically supported by and slidingly rests on a respective vertical support 60 of the main frame suspension arrangement 36, to allow sliding the main frame on the vertical supports 60 along said longitudinal axis L. The vertical supports 60 are provided with slide pads 64, which may be made of e.g. plastic such as polyurethane, for reducing the friction for sliding the main frame 26 along the main frame suspension arrangement 36. The slide pads 64 also define a pair of opposite side supports 62 facing the respective outer side wall faces 56, for guiding the main frame 26 along the longitudinal axis L. FIG. 5 also illustrates the travelling beams 38*a*, 38*b* within their respective travelling beam guides 27*a*, 27*b*. Friction-reducing slide pads 66 are arranged around the circumferences of the travelling beams 38*a*, 38*b*.

Figure 6:
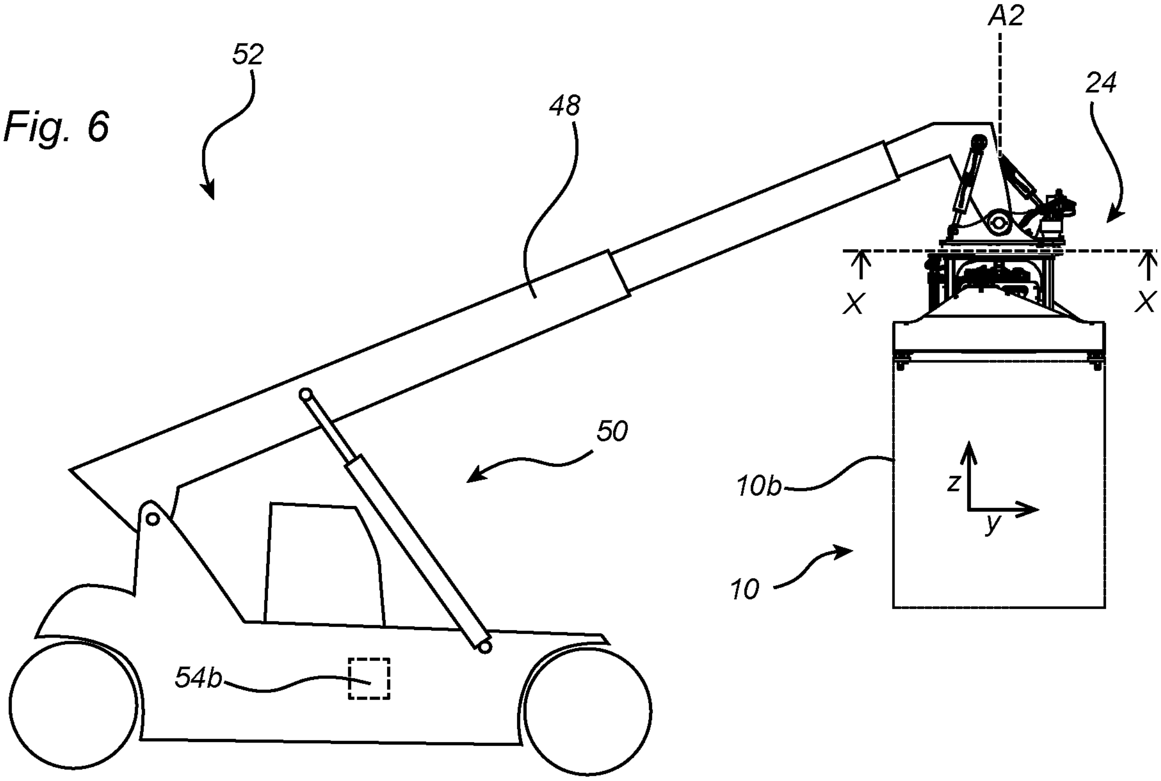
FIG. 6 is a side view of a reach stacker carrying the spreader of FIG. 3, the reach stacker holding the container of FIG. 1 in a first position.

FIG. 6 illustrates the spreader 24 attached to a telescopic boom crane 48 of a truck 50, to form a reach stacker 52. FIG. 6 illustrates the reach stacker 52 with a container 10 attached to the spreader 24. The truck 50 is also provided with a truck control system 54*b*, comprising electronics and/or computer program instructions for controlling the truck 50 and the crane 48, and via the spreader control system 54*a* (FIG. 3), also the spreader 24. The truck and spreader control systems 54*b*, 54*a* together define an overall control system, the functionality of which may be distributed between the truck and spreader control systems 54*b*, 54*a* in an arbitrary manner.

Figure 7:
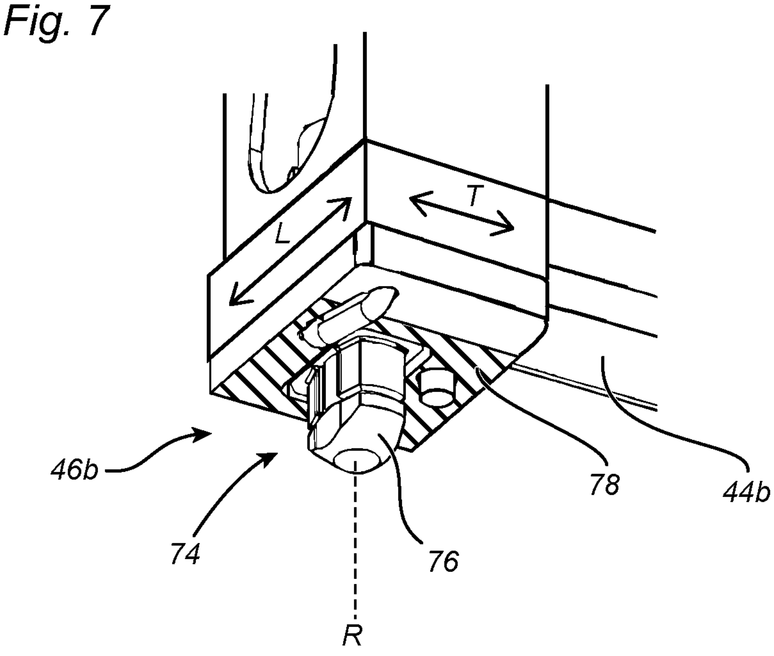
FIG. 7 is a perspective view, as seen obliquely from below, of a lifting casting connector of the spreader of FIG. 3.

FIG. 7 schematically illustrates a twist-lock 46*b* comprising a male locking insert 74 configured to be inserted into a top opening 18 (FIG. 2) of a respective container lifting casting 12*b* (FIG. 2). Once inside the lifting casting 12*b*, an end portion 76 of the male locking insert 74 is configured to be twisted 90° about a vertical axis R to a lock position, in which it engages with the lifting casting 12*b*. An abutment face 78 (hatched), flanking the male locking insert 74, corresponds to the size and shape of the top surface 19 (FIG. 2) of the lifting casting 12*b*, and is configured to rest thereupon once the spreader 24 (FIG. 3) has been lowered onto the container 10.

Figure 8:
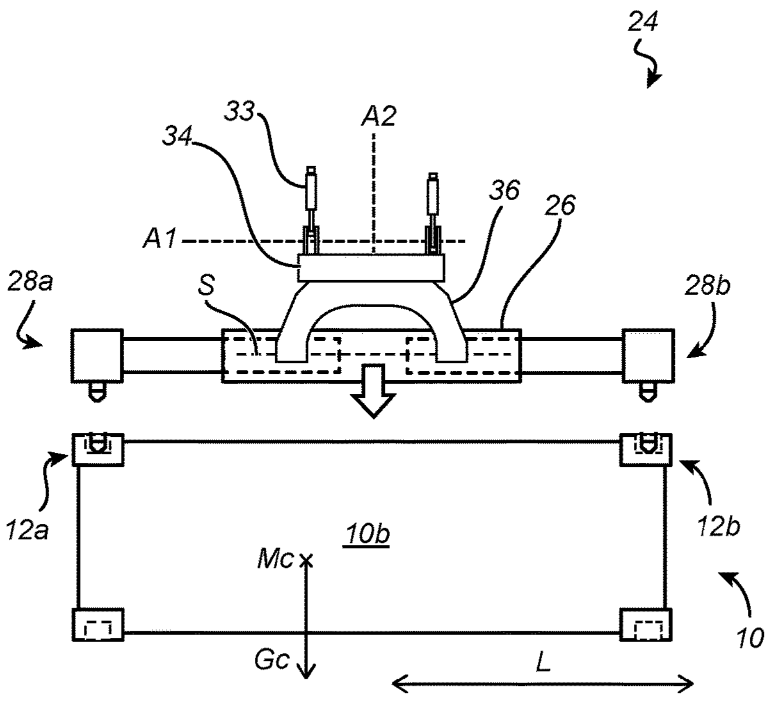
FIG. 8 is a side view illustrating the spreader of FIG. 3 and the container of FIG. 1 prior to connection.

FIG. 8 schematically illustrates a situation in which the spreader 24 is lowered onto a container 10 for connection thereto via the container connector arrangements 28*a*-*b*. The container 10 and the spreader 24 are seen from the longitudinal side 10*b* of the container, i.e. from the longitudinal side of the container 10 which faces the truck 50 (FIG. 6). The container 10 is eccentrically loaded with cargo, such that the container's centre of mass Mc is longitudinally offset from the container's 10 geometric centre. Thereby, the total vertical load on the spreader will be eccentric in the sense that it is separated from the spreader's rotation axis A2. In the view of FIG. 8, the weight of the container 10, i.e. the gravitational force on the container 10, is indicated by arrow Gc.

Figure 9:
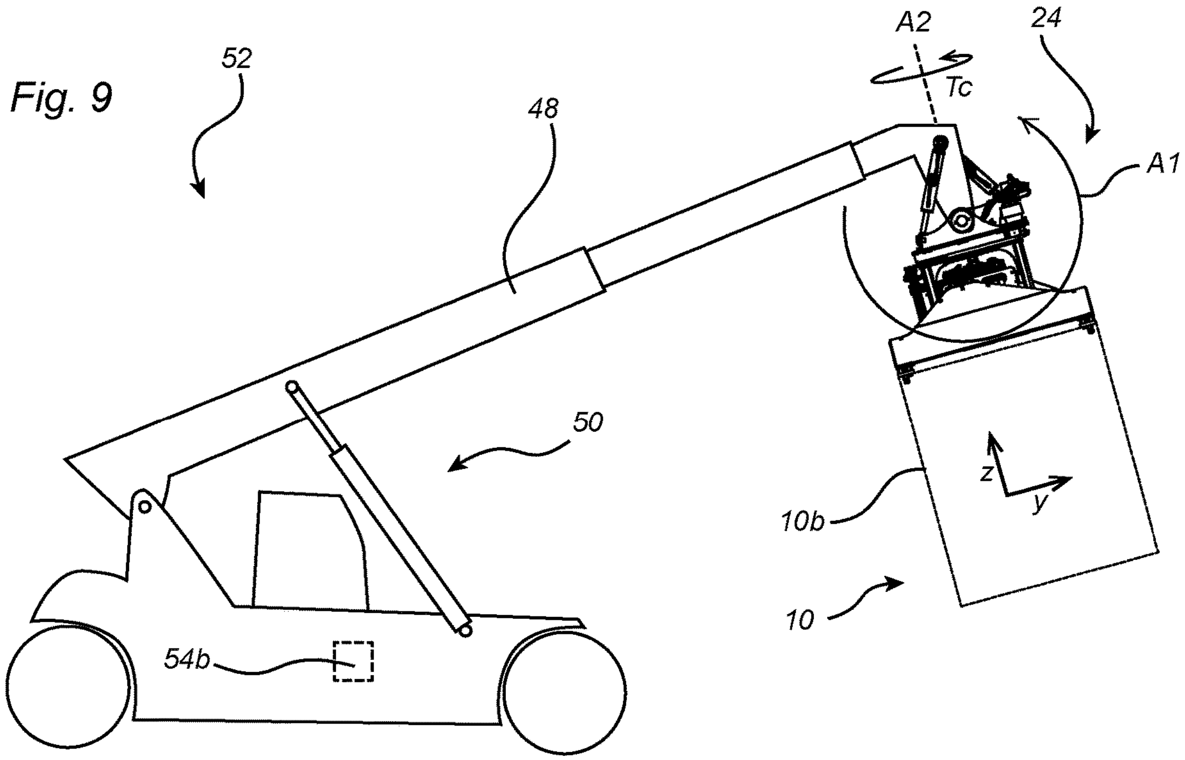
FIG. 9 is a side view of the reach stacker and container of FIG. 6, the reach stacker holding the container in a second position which is tilted in relation to the position of FIG. 6.

FIG. 9 illustrates a potentially dangerous situation, in which an operator of the reach stacker 52 has tilted the spreader 24 with the eccentrically loaded container 10 about the tilt axis A1. In the illustrated situation, the tilted container 10 generates, due to the eccentric load and the tilted rotation axis A2, a torque Tc about the rotation axis A2 in the anticlockwise direction, as seen from above. In order to prevent a rotation induced by the torque Tc, and referring back to FIG. 3, the rotator 34 is provided with rotation brakes 39*a*, 39*b*, which are engaged to prevent rotation in the rotator 34 whenever the rotation motors 35*a*, 35*b* are not operated. The rotation brakes 39*a*, 39*b* are configured as disc brakes arranged within the housings of the rotation motors 35*a*, 35*b*, and are controlled by the spreader control system 54*a*. Whenever the operator operates the rotator 34, the rotation brakes 39*a*, 39*b* automatically release, and whenever the operator stops operating the rotator 34, the rotation brakes 39*a*, 39*b* automatically engage.

However, and again with reference to the situation of FIG. 9, if the operator attempts to rotate the container 10 in the rotation direction opposite to the torque Tc applied by the container, i.e., in the view of FIG. 9, in the clockwise direction as seen from above, a dangerous situation may occur. If the torque Tc applied by the eccentric load is larger than the opposite torque Tm (FIG. 3) applied by the rotation motors 35*a*, 35*b*, the container 10 may start rotating about the rotation axis in the rotation direction determined by the eccentric load-induced torque Tc, instead of the rotation direction determined by the rotation motor-induced torque Tm. It may be intuitive for the operator to keep trying to rotate the container 10 in the intended direction Tm, by keeping operating the rotation motors 35*a*, 35*b*, which may in fact worsen the situation.

In a slightly different situation, the operator may attempt to rotate the container 10 in the same rotation direction as the torque Tc applied by the container 10, i.e., in the view of FIG. 9, in the anti-clockwise direction as seen from above. If the torque Tc applied by the eccentric load is sufficiently large, the container 10 may start rotating about the rotation axis A2 at an uncontrolled speed which is higher than the speed intended by the operator, i.e. higher than the speed dictated by the rotation control signal from the control system 54*a* to the rotation motors 35*a*, 35*b* (FIG. 3).

In both situations, eventually, the uncontrolled rotation may result in that the container 10 may hit an object, a person, or the truck 50. In particular, for long containers, such as 40-foot containers, the truck 50 may be in the rotation path of a container 10. However, the spreader 24 is provided with an arrangement which addresses those potential risks, and which will be elucidated in the following.

Figure 10A:
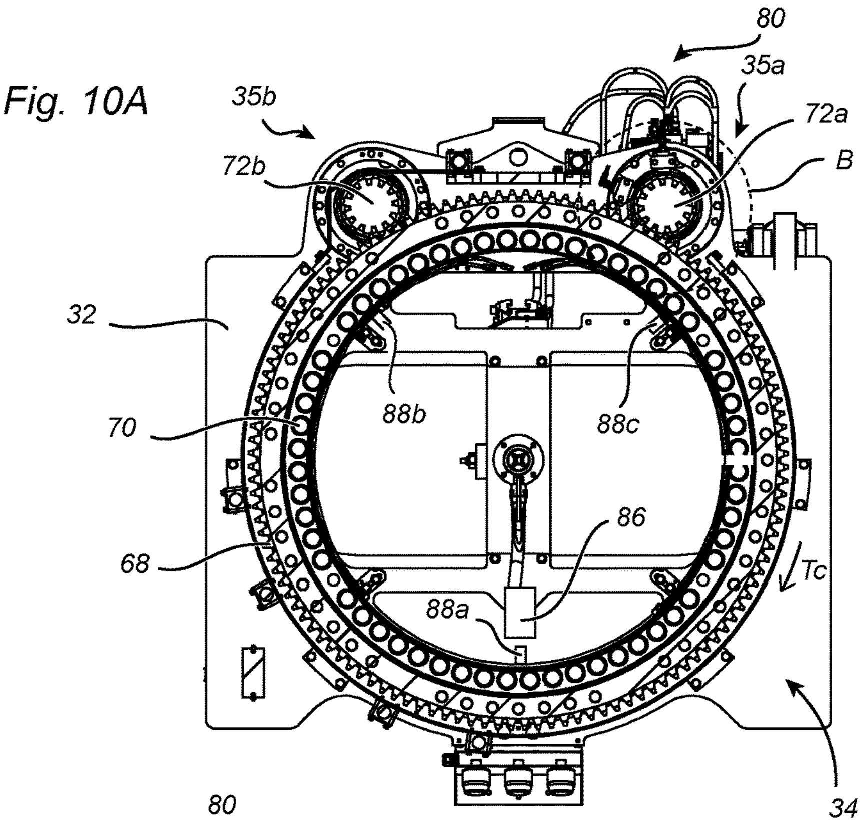
FIG. 10A illustrates a cross-section of a rotator of the spreader of FIG. 3, the cross-section being taken along the line X-X illustrated in FIG. 6.

FIG. 10A illustrates the rotator 34 as seen in the section X-X of FIG. 6. The rotator 34 comprises a gear rim 68, which is rigidly connected to the main frame suspension arrangement 36 (FIG. 3). The rotation motors 35*a*, 35*b* are arranged on the crane bracket side of the rotator 34, and are rigidly connected to the crane bracket 32. A rotator bearing 70 journals the gear rim 68 on the crane bracket 32, allowing the gear rim to rotate about the rotation axis A2 (FIG. 3), together with the main frame suspension arrangement 36, the main frame 26, and any containers carried thereby. Output shafts (not illustrated) of the rotation motors 35*a*, 35*b* (FIG. 3) carry respective rotation motor pinions 72*a*, 72*b*, which drivingly mesh with the teeth of the gear rim. In the illustrated embodiment, each rotation motor pinion 72*a*, 72*b* has 12 gear teeth, whereas the gear rim 68 has 124 gear teeth.

The rotator 34 is also provided with a rotation detector 80 configured to detect the rotation of the first rotation motor pinion 72*a*, and thereby also the rotation about the rotation axis A2 (FIG. 3) of the gear rim 68 and the main frame suspension arrangement 36 (FIG. 8) with the main frame 26 and container 10 in relation to the crane bracket 32. The rotation detector 80 is further configured to detect the rotation speed and rotation direction of the first rotation pinion 72*a*, and thereby also the rotation speed and rotation direction of the main frame suspension arrangement 36 (FIG. 8) with the main frame 26 and container 10 in relation to the crane bracket 32.

Figure 10B:
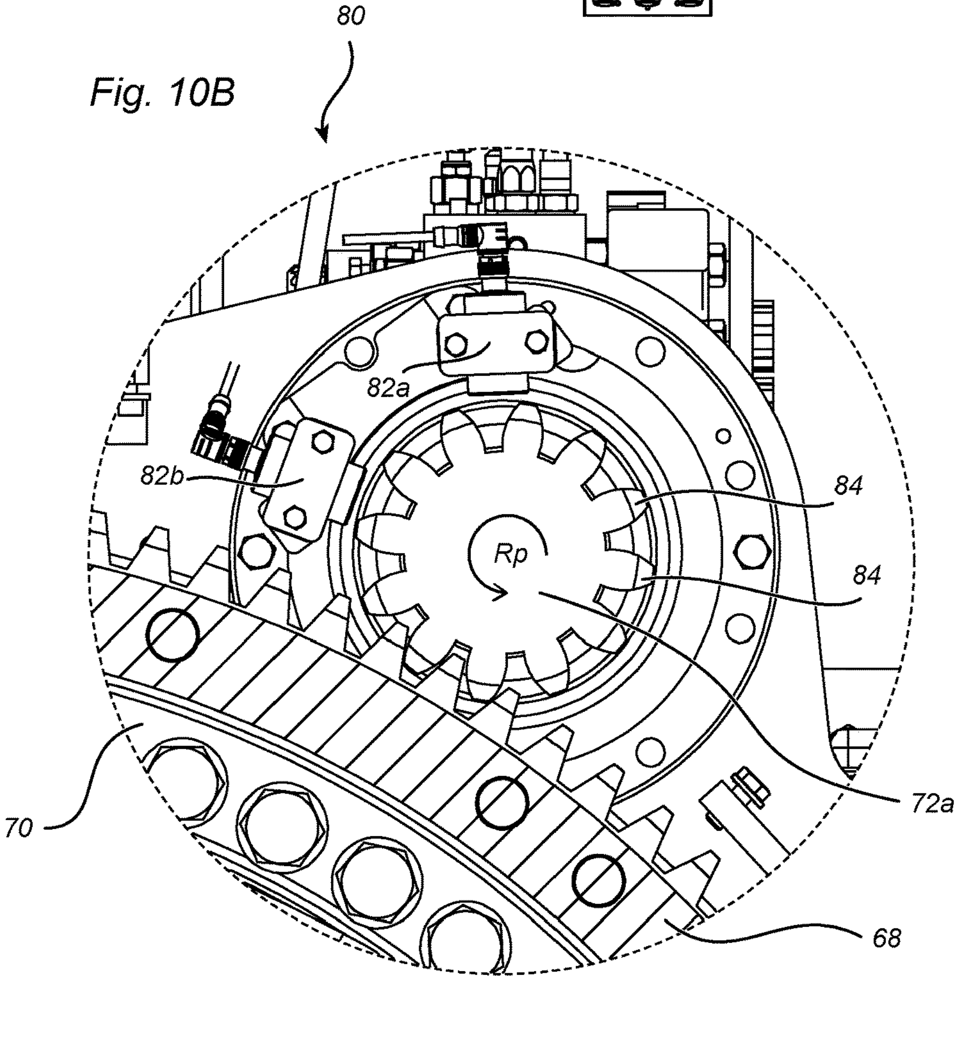
FIG. 10B is a magnified view of a portion of the section of FIG. 10A, the magnified portion indicated by B in FIG. 10A.

The magnified view of FIG. 10B illustrates the rotation detector 80 in greater detail. The rotation detector 80 comprises a first gear tooth detector 82*a* and a second gear tooth detector 82*b*, which are arranged at the periphery of the first rotation motor pinion 72*a*. The gear tooth detectors 82*a-b* are configured to detect the presence of the gear teeth 84 of the first rotation motor pinion 72*a*, and may be, for example, inductive sensors. Upon rotation of the first rotation motor pinion 72*a*, each of the gear tooth detectors 82*a-b* will generate a periodic signal, wherein the period of the periodic signal indicates the rotation speed. The two gear tooth detectors 82*a-b* are positioned such that they will provide respective tooth detection signals which are out of phase with each other by 90°. Thereby, the relative phase between the signals from the respective gear tooth detectors 82*a-b* will indicate the rotation direction of the first rotation motor pinion 72*a*, and thereby also the rotation direction of the main frame suspension arrangement 36 (FIG. 8) with the main frame 26 and container 10 in relation to the crane bracket 32, which is opposite to the rotation direction of the first rotation motor pinion 72*a*.

Figure 11:
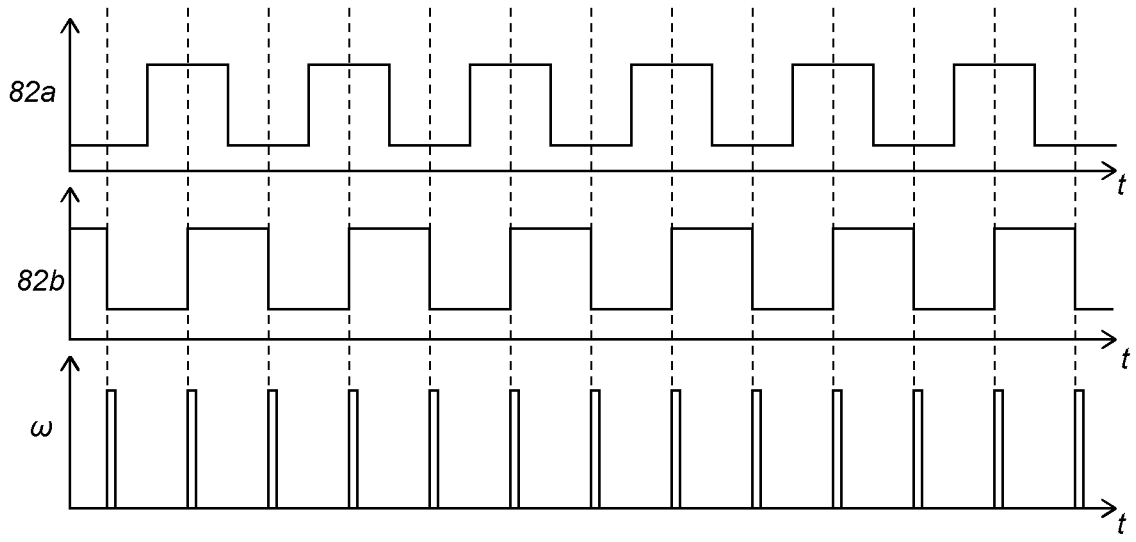
FIG. 11 is a diagram illustrating exemplary signals from a rotation detector of the spreader of FIG. 3.

FIG. 11 illustrates an example of the signals from the gear tooth detectors 82*a*, 82*b* as a function of time t, wherein a high signal indicates the presence of a gear tooth in front of the respective gear tooth detector 82*a-b*, and a low signal indicates the absence of a gear tooth in front of the respective gear tooth detector 82*a-b*. The phase of the signal from the first gear tooth detector 82*a* is 90° ahead of the signal from the second gear tooth detector 82*b*, which indicates that the first rotation motor pinion 72*a* rotates in a rotation direction Rp (FIG. 10B), corresponding to the direction of the torque Tc (FIG. 10A) generated by the eccentrically loaded container 10 (FIG. 9). In the opposite rotation direction, the phase of the signal from the second gear tooth detector 82*b* would instead have been 90° ahead of the signal from the first gear tooth detector 82*a*. Each transition from high signal to low signal, or from low signal to high signal, of any of the gear tooth detectors 82*a-b* is also detected. The transitions ω are illustrated in the lowermost chart, and their frequency is indicative of the rotation speed. Each gear tooth 84 generates, during each full turn of the rotation motor pinion 72*a*, two transitions at each gear tooth detector 82*a*, 82*b*. Thereby, a full 360° turn of the rotator 34 would correspond to 124*2*2=496 transitions ω, which results in an angular resolution of the rotation detector 80, with regard to rotation of the main frame 26 (FIG. 3) about the rotation axis A2, of 360°/496, i.e. about 0.7°. Based on each transition w, the control system 54*a* may update a transition counter which, based on the detected rotation direction, either adds or subtracts the detected transitions ω from the transition counter. Thereby, the control system 54*a* (FIG. 3) may keep track of a total rotation relative to a start position. The rotation counter may be kept in a non-volatile memory, such that its value may be recovered upon loss of electric power. Referring back to FIG. 10A, the rotator 34 may also be provided with a reference position sensor 86 configured to detect at least one absolute angular position of the rotator 34, in order to provide a reference position for resetting the transition counter. By way of example, the reference position sensor 86 may be configured as an inductive sensor attached to the crane bracket 32, and be configured to detect metallic detection bodies 88*a-c* rigidly connected to the gear rim 68. The detection bodies 88*a-c* may comprise a centre detection body 88*a*, representing when the main frame's 26 longitudinal axis L extends parallel to the tilt axis A1, and two rotator end position detection bodies 88*b*, 88*c*, representing a maximum permitted rotation in each direction. The spreader control system 54*a* may be configured to re-set the rotation counter to a respective predetermined value each time the reference sensor 86 is positioned in front of a respective detection body 88*a*, 88*b*, 88*c*.

Returning to the situation illustrated in FIG. 9, and assuming that the operator makes an attempt to rotate the main frame 26 clockwise, as seen from above, the spreader control system 54*a* (FIG. 3) will generate a rotation control signal to the rotation motors 35*a*, 35*b* to rotate the rotation motor pinions accordingly, to apply a rotation torque to the main frame 26 in the direction indicated by Tm in FIG. 3. If the spreader control system 54*a* receives, in response to applying the torque in the intended rotation direction, the gear tooth detector signals illustrated in FIG. 11, this is an indication that the rotator 34 rotates in the rotation direction opposite to the intended rotation direction, i.e. in the direction indicated by Tc in FIG. 9. Based on the discrepancy between the rotation control signal and the rotation detected by the rotation detector 80 (FIG. 10A), the spreader control system 54*a* will issue a rotation alert signal. The rotation alert signal may serve as a basis for directly and automatically engaging the rotation brakes 39*a*, 39*b* (FIG. 3) and stopping the rotation motors 35*a*, 35*b*, or for prompting the operator to stop the attempt to rotate the spreader 24, such that the rotation brakes 39*a*, 39*b* may automatically engage. The control system 54*a* may also impose other control constraints, such as limiting further lifting of the container 10 from the ground, and/or preventing further tilting of the container about the tilt axis A1.

Similarly, if the signal from the rotation detector rotation speed exceeds a limit speed, corresponding to a limit frequency of transitions ω (FIG. 11), the spreader control system 54*a* may be configured to, regardless of the detected rotation direction, automatically engage the rotation brakes 39*a*, 39*b* (FIG. 3) and stop the rotation motors 35*a*, 35*b*.

Figure 12A:
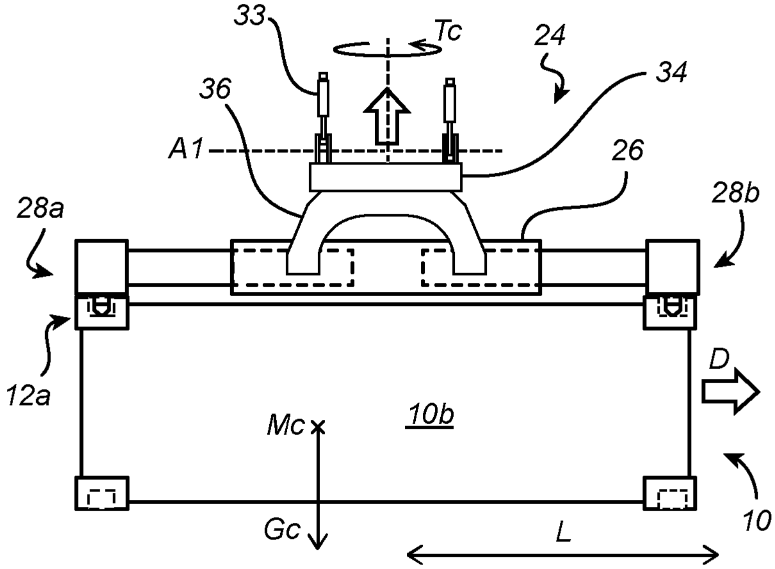
FIG. 12A is a side view of the spreader of FIG. 3, the side view corresponding to the view of FIG. 8, and illustrating the spreader prior to connection to the container.

Based on the detected rotation direction about the rotation axis A2, the spreader control system 54*a* may determine an eccentricity of the load of the container 10. FIG. 12A illustrates, in a view corresponding to that of FIGS. 8, a situation in which the spreader 24 has connected to the container 10, and initiated a lift along the arrow of FIG. 12A as well as a tilt about the tilt axis A1, resulting in the position of FIG. 9. If rotation is attempted, the spreader control system 54*a* (FIG. 3) can, by comparing the rotation control signal with the detected rotation, get an indication of the direction and magnitude of the load eccentricity-induced torque Tc generated by the container 10. Based on the direction and magnitude of the detected torque Tc, the spreader control system 54*a* may determine a preferred side-shift direction D along the longitudinal axis L, in which preferred side-shift direction the main frame 26 should be side-shifted relative to the main frame suspension arrangement 36 in order to compensate for the eccentric load. The spreader control system 54*a* (FIG. 3) may, for example, prevent the operator from side-shifting the main frame 26 in a direction opposite to the preferred side-shift direction D. The spreader control system 54*a* may also prompt the operator of the reach stacker 50 (FIG. 9) to operate the side-shift mechanism 37 to side-shift the main frame 26 in the preferred direction D, or automatically operate the side-shift mechanism 37 to translate the main frame 26 in the direction D, in order to bring the container's centre of mass Mc closer to the rotation axis A2. A side-shift of the main frame 26 in the direction D brings us from the situation of FIG. 12A to the situation of FIG. 12B, in which the risk of uncontrolled rotation of the main frame 26 and the container 10 about the rotation axis A2 is substantially reduced, since the container's 10 centre of mass Mc is closer to the rotation axis A2.

A rotation attempt is not needed for determining an eccentricity of the load of the container 10. According to a further example, the position of the container's 10 centre of mass Mc may be detected based on load sensors (not illustrated) in the container connector arrangements 28*a*, 28*b*, the load sensors determining the vertical load carried by the respective container connector arrangements 28*a*, 28*b*, The spreader control system 54*a* may thereafter determine a preferred side-shift position based on the determined position of the centre of mass Mc. The preferred side-shift position may be compared to the present side-shift position, for obtaining a preferred direction D (FIG. 12A) in which to side-shift the main frame 26 with the container 10. Based on the position of the centre of mass Mc, the spreader control system 54*a* may also apply control constraint based on the detected eccentricity, such as engaging the rotation brakes 39*a*, 39*b*, limiting tilt about the tilt axis A1, and/or preventing a side-shift of the main frame 26 in the direction opposite to the preferred side-shift direction D (FIG. 12A).

Figure 12B:
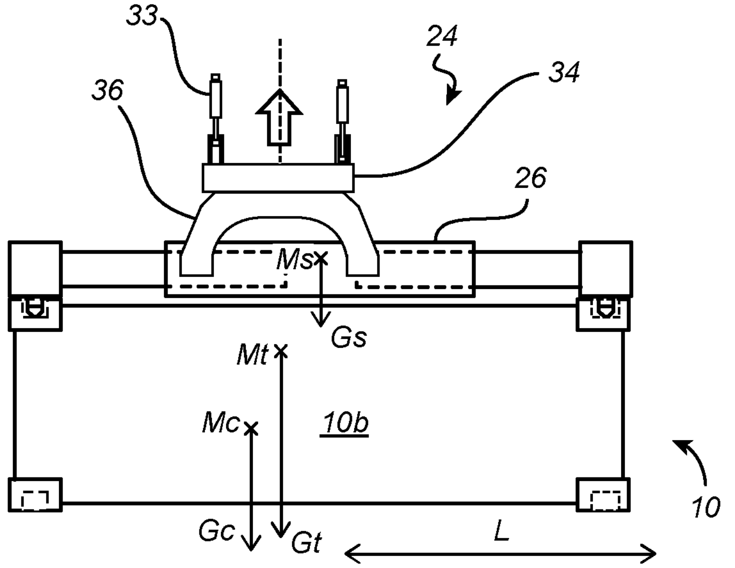
FIG. 12B is a side view of the spreader of FIG. 3, the side view corresponding to the view of FIG. 12A, and illustrating the spreader after having side-shifted the container.

FIG. 12B also illustrates the possibility of determining a total weight Gt, and a combined centre of mass Mt, of the entire system consisting of the spreader 24 and the container 10. The total weight Gt and centre of mass Mt may be determined based on the container weight Gt and centre of mass Mc as determined by the load sensors, combined with a prior knowledge of the spreader's 24 centre of mas Ms and weight Gs.

Figure 13:
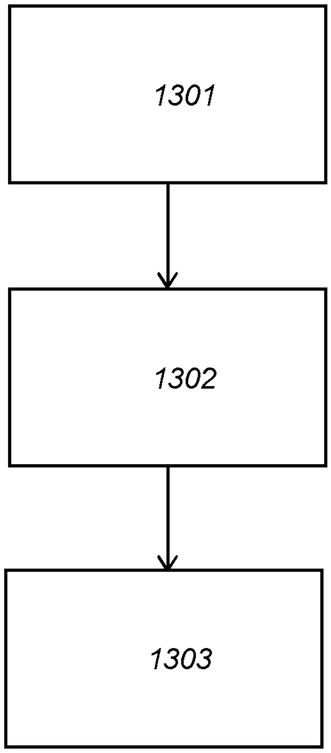
FIG. 13 is a flow chart illustrating a method of handling a container.

FIG. 13 illustrates a method of handling a transport container 10 (FIG. 1) using a spreader, such as the spreader 24 (FIG. 3) described in detail hereinabove, the method comprising:

1301: determining a rotation status of the transport container 10 based on a signal from a rotation sensor, such as the rotation sensor 80;

1302: comparing the rotation status to an expected rotation status determined based on a rotation control signal; and

1303: based on said comparison, generating a rotation alert signal.

The invention has mainly been described above with reference to a few embodiments. However, as is readily appreciated by a person skilled in the art, other embodiments than the ones disclosed above are equally possible within the scope of the invention, as defined by the appended patent claims.

For example, an absolute or relative rotation of the main frame 26 about the rotation axis A2 can be determined using many different types of sensors, and the scope is not in any way limited to the use of inductive sensors or sensors detecting the presence of gear teeth. Moreover, even though the spreader 24 described in detail hereinbelow is a top-lift spreader, the teachings are equally applicable to side-lift spreaders configured to attach to a transport container at only one single longitudinal side thereof. The rotation alert signal may be used in many different ways for mitigating the consequences of an eccentrically loaded container. Moreover, any rotation brake need not be of a disc-brake type; it may be any type of brake suitable for braking or blocking a rotation of the main frame 26 relative to the crane bracket 32. It is pointed out that the teachings herein may be applicable also to a spreader which does not enable side-shifting of the main frame in relation to the crane bracket.

In the claims, the word "comprising" does not exclude other elements or steps, and the indefinite article "a" or "an" does not exclude a plurality.

The invention claimed is:

1. A spreader system comprising a spreader for lifting a transport container, the spreader comprising:

a main frame having a first end and a second end, and extending along a longitudinal axis between said first end and said second end, the first end carrying a first container connector arrangement and the second end carrying a second container connector arrangement, each of said first and second container connector arrangements being configured to engage with a transport container;

a main frame carrier comprising a crane bracket and a rotator enabling rotation of the main frame, and thereby any container held by the spreader, in relation to the crane bracket about a substantially vertical rotation axis;

a rotation motor configured to, responsive to a rotation control signal, operate the rotator to rotate the main frame in relation to the crane bracket; and a rotation detector configured to detect rotation of the main frame in relation to the crane bracket, wherein the spreader system further comprises a control system configured to, based on a discrepancy between the rotation control signal and a rotation detected by the rotation detector, generate a rotation alert signal, wherein the rotation detector is configured to detect a rotation direction of the main frame in relation to the crane bracket.

2. The spreader system according to claim 1, wherein the control system is configured to generate said rotation alert signal based on a determination that a detected rotation direction is opposite to a rotation direction dictated by said rotation control signal.

3. The spreader system according to claim 1, wherein the rotation detector is configured to determine a rotation speed of the main frame in relation to the crane bracket.

4. The spreader system according to claim 1, wherein the rotation detector is configured to determine an absolute rotation in relation to a reference position.

5. The spreader system according to claim 1, further comprising at least one rotation brake configured to, based on said rotation alert signal, mechanically brake and/or block a rotation between the crane bracket and the main frame.

6. The spreader system according to claim 1, wherein the control system is configured to, based on the rotation alert signal, stop the operation of the rotation motor and/or generate a warning signal via a user interface.

7. The spreader system according to claim 1, wherein the control system is configured to, based on said rotation alert signal, impose a control constraint limiting a set of permissible operations of the spreader.

8. The spreader system according to claim 1, wherein the rotation motor is a hydraulic motor.

9. The spreader system according to claim 1, wherein the rotation motor is connected to the rotator via a gear arrangement, wherein the rotation detector is configured to detect rotation based on detection of the presence of at least one gear tooth of the gear arrangement.

10. The spreader system according to claim 9, wherein the rotation detector comprises two gear tooth detectors arranged at a periphery of a gear of the gear arrangement, at mutual positions enabling said gear tooth detectors to sense the presence of gear teeth out of phase with each other.

11. A spreader system comprising a spreader for lifting a transport container, the spreader comprising:

a main frame having a first end and a second end, and extending along a longitudinal axis between said first end and said second end, the first end carrying a first container connector arrangement and the second end carrying a second container connector arrangement, each of said first and second container connector arrangements being configured to engage with a transport container;

a main frame carrier comprising a crane bracket and a rotator enabling rotation of the main frame, and thereby any container held by the spreader, in relation to the crane bracket about a substantially vertical rotation axis;

a rotation motor configured to, responsive to a rotation control signal, operate the rotator to rotate the main frame in relation to the crane bracket; and a rotation detector configured to detect rotation of the main frame in relation to the crane bracket, wherein the spreader system further comprises a control system configured to, based on a discrepancy between the rotation control signal and a rotation detected by the rotation detector, generate a rotation alert signal, wherein the rotation detector is configured to determine a rotation speed of the main frame in relation to the crane bracket, and wherein the rotation detector is configured to generate said rotation alert signal based on said speed exceeding a limit speed.

12. A spreader system comprising a spreader for lifting a transport container, the spreader comprising:

a main frame having a first end and a second end, and extending along a longitudinal axis between said first end and said second end, the first end carrying a first container connector arrangement and the second end carrying a second container connector arrangement, each of said first and second container connector arrangements being configured to engage with a transport container;

a main frame carrier comprising a crane bracket and a rotator enabling rotation of the main frame, and thereby any container held by the spreader, in relation to the crane bracket about a substantially vertical rotation axis;

a rotation motor configured to, responsive to a rotation control signal, operate the rotator to rotate the main frame in relation to the crane bracket; and a rotation detector configured to detect rotation of the main frame in relation to the crane bracket, wherein the spreader system further comprises a control system configured to, based on a discrepancy between the rotation control signal and a rotation detected by the rotation detector, generate a rotation alert signal, wherein the main frame is connected to the rotator via a main frame suspension arrangement, and wherein the main frame is translatably suspended in said main frame suspension arrangement to enable translation along said longitudinal axis.

13. A spreader system comprising a spreader for lifting a transport container, the spreader comprising:

a main frame having a first end and a second end, and extending along a longitudinal axis between said first end and said second end, the first end carrying a first container connector arrangement and the second end carrying a second container connector arrangement, each of said first and second container connector arrangements being configured to engage with a transport container;

a main frame carrier comprising a crane bracket and a rotator enabling rotation of the main frame, and thereby any container held by the spreader, in relation to the crane bracket about a substantially vertical rotation axis;

a rotation motor configured to, responsive to a rotation control signal, operate the rotator to rotate the main frame in relation to the crane bracket; and a rotation detector configured to detect rotation of the main frame in relation to the crane bracket, wherein the spreader system further comprises a control system configured to, based on a discrepancy between the rotation control signal and a rotation detected by the rotation detector, generate a rotation alert signal, wherein the control system is configured to, based on said rotation alert signal, impose a control constraint limiting a set of permissible operations of the spreader, and wherein said control constraint limits side-shifting of the main frame along said longitudinal axis.

14. A spreader system comprising a spreader for lifting a transport container, the spreader comprising:

a main frame having a first end and a second end, and extending along a longitudinal axis between said first end and said second end, the first end carrying a first container connector arrangement and the second end carrying a second container connector arrangement, each of said first and second container connector arrangements being configured to engage with a transport container;

a main frame carrier comprising a crane bracket and a rotator enabling rotation of the main frame, and thereby any container held by the spreader, in relation to the crane bracket about a substantially vertical rotation axis;

a rotation motor configured to, responsive to a rotation control signal, operate the rotator to rotate the main frame in relation to the crane bracket; and a rotation detector configured to detect rotation of the main frame in relation to the crane bracket, wherein the spreader system further comprises a control system configured to, based on a discrepancy between the rotation control signal and a rotation detected by the rotation detector, generate a rotation alert signal, wherein the spreader comprises a detector for detecting a position along said longitudinal axis of a centre of mass of the container, or of the spreader and any container attached thereto, wherein said control system is configured to, based on a detected position of said centre of mass, brake or block a rotation between the crane bracket and the main frame, and/or impose a control constraint limiting a possibility to tilt the rotator about an axis parallel to the longitudinal axis.

15. A spreader system comprising a spreader for lifting a transport container, the spreader comprising:

a main frame having a first end and a second end, and extending along a longitudinal axis between said first end and said second end, the first end carrying a first container connector arrangement and the second end carrying a second container connector arrangement, each of said first and second container connector arrangements being configured to engage with a transport container;

a main frame carrier comprising a crane bracket and a rotator enabling rotation of the main frame, and thereby any container held by the spreader, in relation to the crane bracket about a substantially vertical rotation axis;

a rotation motor configured to, responsive to a rotation control signal, operate the rotator to rotate the main frame in relation to the crane bracket; and a rotation detector configured to detect rotation of the main frame in relation to the crane bracket, wherein the spreader system further comprises a control system configured to, based on a discrepancy between the rotation control signal and a rotation detected by the rotation detector, generate a rotation alert signal, wherein the first container connector arrangement comprises a first travelling beam, and the second container connector arrangement comprises a second travelling beam, wherein a proximal end of the first travelling beam is guided in the main frame to be telescopically extendable from the main frame in a first direction along said longitudinal axis, and a distal end of the first travelling beam is configured to engage with a first end of said transport container, and wherein a proximal end of the second travelling beam is guided in the main frame to be telescopically extendable from the main frame in a second direction along said longitudinal axis, and a distal end of the second travelling beam is configured to engage with a second end of said transport container.

16. A spreader system comprising a spreader for lifting a transport container, the spreader comprising:

a main frame having a first end and a second end, and extending along a longitudinal axis between said first end and said second end, the first end carrying a first container connector arrangement and the second end carrying a second container connector arrangement, each of said first and second container connector arrangements being configured to engage with a transport container;

a main frame carrier comprising a crane bracket and a rotator enabling rotation of the main frame, and thereby any container held by the spreader, in relation to the crane bracket about a substantially vertical rotation axis;

a rotation motor configured to, responsive to a rotation control signal, operate the rotator to rotate the main frame in relation to the crane bracket; and a rotation detector configured to detect rotation of the main frame in relation to the crane bracket, wherein the spreader system further comprises a control system configured to, based on a discrepancy between the rotation control signal and a rotation detected by the rotation detector, generate a rotation alert signal, wherein each of said first and second container connector arrangements comprises a respective transversal beam extending in a direction transversal to the longitudinal axis, each of said transversal beams being provided with two respective lifting casting connectors separated along said transversal direction, for connecting to two lifting castings of said transport container.

17. A spreader for lifting a transport container, the spreader comprising a main frame having a first end and a second end, and extending along a longitudinal axis between said first end and said second end, the first end being provided with a first container connector arrangement and the second end being provided with a second container connector arrangement, each of said first and second container connector arrangements comprising at least one respective lifting casting connector configured to engage with a lifting casting of a transport container;

a main frame carrier comprising a crane bracket and a rotator enabling rotation of the main frame, and thereby any container held by the spreader, in relation to the crane bracket about a rotation axis which is substantially perpendicular to the longitudinal axis;

a rotation motor connected to the rotator via a gear arrangement and configured to, responsive to a rotation control signal, operate the rotator to rotate the main frame in relation to the crane bracket, and a rotation detector configured to detect rotation of the main frame in relation to the crane bracket, the rotation detector comprising a gear tooth detector configured to detect the presence of at least one gear tooth of the gear arrangement.

* * * * *